United States Patent
Yamaguchi et al.

(10) Patent No.: US 6,898,069 B2
(45) Date of Patent: May 24, 2005

(54) MULTILAYER ELECTRONIC COMPONENT AND MANUFACTURING METHOD THEREOF

(75) Inventors: Katsuyoshi Yamaguchi, Kokubu (JP); Nobuhiro Higashihara, Osaka (JP); Hideto Sakoda, Osaka (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/809,251

(22) Filed: Mar. 25, 2004

(65) Prior Publication Data

US 2004/0190221 A1 Sep. 30, 2004

(30) Foreign Application Priority Data

Mar. 26, 2003 (JP) .......................................... 2003-86059
Apr. 24, 2003 (JP) ....................................... 2003-120776

(51) Int. Cl.[7] ............................................. H01G 4/005
(52) U.S. Cl. ................. 361/303; 361/306.3; 361/321.2; 29/25.41; 29/25.42
(58) Field of Search ............................ 361/303, 306.2, 361/306.3, 321.2, 329; 29/25.41, 25.42, 532

(56) References Cited

U.S. PATENT DOCUMENTS

| | | | | |
|---|---|---|---|---|
| 6,370,015 B2 | * | 4/2002 | Noda et al. | 361/321.2 |
| 6,577,494 B2 | * | 6/2003 | Watanabe et al. | 361/321.2 |
| 6,645,897 B2 | * | 11/2003 | Nakamura et al. | 501/137 |

FOREIGN PATENT DOCUMENTS

JP         2000-243650         9/2000

* cited by examiner

*Primary Examiner*—Anthony Dinkins
(74) *Attorney, Agent, or Firm*—Hogan & Hartson LLP (57) ABSTRACT

A multilayer electronic component of the present invention includes dielectric layers (7) and internal electrode layers (5) that are alternatively laminated. The internal electrode layers (5) are exposed alternatively to opposite sides in a laminating direction. The multilayer electronic component has at both ends thereof external electrodes (3) connected to the internal electrode layers (5), and the thickness of a connected end of the internal electrode layers (5) with the external electrodes (3) is greater than the thickness of a non-connecting end. Therefore, even if the internal electrode layers (5) are thinned, the multilayer electronic component is excellent in electrical connection property between the internal electrode layer (5) and the external electrodes (5), thereby obtaining high electrostatic capacity.

19 Claims, 5 Drawing Sheets

MULTILAYER ELECTRONIC COMPONENT AND MANUFACTURING METHOD THEREOF

Priority is claimed to Japanese Patent Application No. 2003-86059 filed on Mar. 26, 2003, and No. 2003-120776 filed on Apr. 24, 2003, the disclosure of which is incorporated by reference in its entirety.

BACKGROUND OF THE INVENTION

1. Field of the Invention

The present invention relates to a multilayer electronic component and a manufacturing method thereof and, in particular, a multilayer electronic component whose internal electrode layers are thinned, such as a multilayer ceramic capacitor, as well as a manufacturing method of the same.

2. Description of Related Art

Recently, along with miniaturization and high densification of electronic component, a multilayer electronic component such as a multilayer ceramic capacitor is required to have a small size, a high capacity and a high reliability. Therefore the multilayer electronic component is aimed at: (i) thinning a dielectric layer and increasing the number of laminated layers; (ii) thinning internal electrode layers; and (iii) increasing the dielectric constant of the dielectric layer. For example, there has been developed a multilayer electronic component of high capacity wherein a dielectric layer has a thickness of 5 μm or less and 100 or more dielectric layers are laminated.

The internal electrode layers of a multilayer electronic component have heretofore been formed by screen-printing method using a conductive paste. The internal electrode layers contain, as a conductive paste component, a coexisting ingredient composed of ceramic powder other than a metal component, a resin component and an organic solvent component and the like. The internal electrode layers are formed in a mesh. It is therefore difficult to completely cover a region at which the internal electrode layers should be formed originally. This results in the problem that the effective area of the internal electrode layers is reduced, failing to obtain electrostatic capacity.

In order to solve the above problem due to thinning of internal electrode layers, for example, Japanese Patent Application Laid-Open No. 2000-243650 discloses a multilayer electronic component, in which a metal film serving as an internal electrode layer is formed on a film by a physical thin-film forming method such as sputtering or evaporation, alternatively, a chemical thin-film forming method such as electroless plating, and an internal electrode pattern is formed by transferring the metal film onto a dielectric green sheet, thereby manufacturing a multilayer electronic component.

In accordance with the multilayer electronic component disclosed in Japanese Patent Application Laid-Open No. 2000-243650, the metal film serving as an internal electrode layer is formed on the film so as to have a uniform thickness by a physical thin-film forming method such as sputtering or evaporation, alternatively, a chemical thin-film forming method such as electroless plating, and the internal electrode pattern is formed by transferring the metal film onto the dielectric green sheet, thereby manufacturing the multilayer electronic component.

However, the use of such an internal electrode pattern that is uniform in thickness increases the effective area of the internal electrode layer, whereas electric connection property between the internal electrode layer and an external electrode is liable to degrade because the sectional area of an edge is reduced when the internal electrode pattern is thinned. As the result, the electrostatic capacity according to a design is hard to develop, thus leading to the problem of increasing variations in electrostatic capacity.

SUMMARY OF THE INVENTION

An advantage of the present invention is to provide a multilayer electronic component excellent in electric connection property between an internal electrode layer and an external electrode even when the internal electrode layer is thinned, as well as a method of manufacturing the same.

A multilayer electronic component of the present invention includes dielectric layers and internal electrode layers that are alternately laminated. The internal electrode layers comprise an electronic component body alternately exposed at an end face on the opposite side in a laminating direction, and external electrodes that are disposed on both end faces of the electronic component body and connected to the internal electrode layers. The thickness in a connecting end of the internal electrode layers with the external electrodes is greater than the thickness of a non-connecting end.

In the above multilayer electronic component, the internal electrode layer is preferably thinned gradually from the connecting end to the non-connecting end.

With this construction, even if the internal electrode layer is thinned, the thickness of the connecting end of the internal electrode layer with the external electrode is great, thereby increasing electric connection property between the internal electrode layer and the external electrode. As the result, it is capable of obtaining the electrostatic capacity according to a design and also reducing variations in electrostatic capacity. It is also capable of increasing the effective area because the internal electrode layer has an inclined face because of its thickness changes.

A method of manufacturing a multilayer electronic component in the present invention includes the step of preparing a substrate plate having a mask pattern; the step of performing electroplating in a state in which the substrate plate is tilted such that the mask pattern faces downward, so that an internal electrode pattern whose edges have different thickness is formed in a recess part partitioned by the mask pattern in the surface of the substrate plate; the step of transferring the internal electrode pattern on the substrate plate surface onto a dielectric green sheet; the step of forming a lamination forming body by laminating such that a total thickness of edges of the internal electrode pattern is compensated for in a laminating direction; and the step of forming an electronic component base forming body in which one edge of the internal electrode pattern is exposed by cutting the lamination forming body in the laminating direction.

Other multilayer electronic component of the present invention comprises an electronic component body having a capacity part for developing electrostatic capacity that is formed by alternately laminating dielectric layers and internal electrode layers, and a non-capacity part not developing electrostatic capacity that is formed around the periphery of the capacity part by the dielectric layers; and a pair of external electrodes disposed at both end faces of the electronic component body, respectively, and connected to the internal electrode layer. The electronic component body has at both end faces thereof extending parts continuous from the internal electrode layers.

BRIEF DESCRIPTION OF THE DRAWINGS

FIGS. 2(a) to 2(e) are views showing a process for manufacturing the multilayer electronic component shown in FIG. 1;

FIGS. 3(a) to 3(c) are schematic views showing the steps of forming an internal electrode pattern;

FIGS. 6(a) to 6(d) are views showing a process for manufacturing the multilayer electronic component shown in FIGS. 4 and 5.

DESCRIPTION OF PREFERRED EMBODIMENTS

<First Preferred Embodiment>

Figure 1:
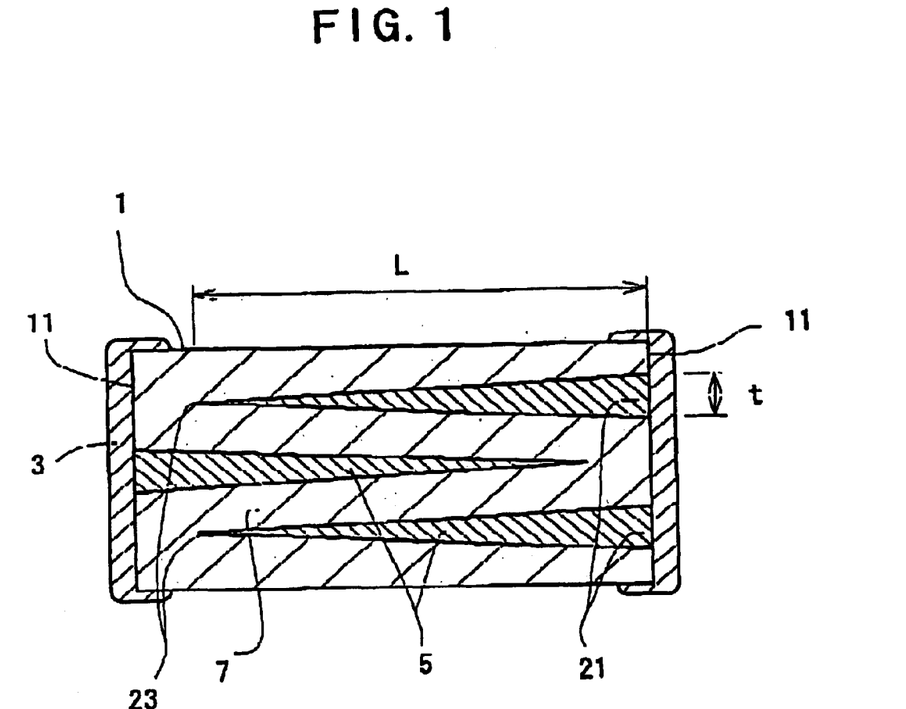
FIG. 1 is a schematic sectional view showing one example of a multilayer electronic component according to the present invention.

One preferred embodiment of a multilayer ceramic capacitor that is a multilayer electronic component of the present invention is now described in detail based on FIG. 1. Referring to FIG. 1, in the multilayer electronic component of the present invention there are formed external electrodes 3, 3 on both ends of an electronic component body 1 in the shape of a rectangular parallelopiped.

The electronic component body 1 is constructed by alternately laminating internal electrode layers 5 and dielectric layers 7. The internal electrode layers 5 are exposed alternately to both end faces 11 of the electronic component body 1, and electrically connected alternately to the external electrodes 3, 3.

It is essential for the internal electrode layer 5 that the thickness at a connecting end 21 with the external electrode 3 be greater than the thickness of an opposing non-connecting end 23. The internal electrode layers 5 are preferably thinned gradually from the connecting end 21 to the non-connecting end 23.

In the present invention, the internal electrode layers 5 having different thicknesses means one which has at least 0.1 μm or more in the difference between a maximum thickness and a minimum thickness in a plane of the internal electrode layer 5, and it is considered that one having a difference in thickness of below 0.1 μm has substantially a uniform thickness.

For the purposes of reducing unevenness due to a difference in thickness of the internal electrode layer 5 and relaxing variations in thickness of the dielectric layer 7, in the present invention it is desirable to satisfy the relationship: (L/t)≧500 (e.g., with 0.5 mm in length and 1 μm in thickness), where L is a distance from the connecting end 21 to the non-connecting end 23, and t is a maximum thickness of the internal electrode layer 5. More preferably, L/t is 4000 or more.

Even in such an internal electrode layer of the present invention that is thickened on the connecting end with external electrodes, the internal electrode layer is preferably thickened gradually so as to have a smooth tilt toward the connecting end, in order to reduce unevenness due to a difference in thickness of the internal electrode layer and relax variations in thickness of the dielectric layer. The internal electrode layer specified by the requirements of L/t is capable of increasing the connection property with the external electrodes and also further suppressing defects such as delamination.

An average thickness of the internal electrode layer 5 is preferably 1 μm or less, particularly 0.8 μm or less. The average thickness of the internal electrode layer 5 is found from (tmax+tmin)/2, where tmax is a maximum thickness of the internal electrode layer 5, and tmin is a minimum thickness thereof.

For the purpose of increasing connection property between the internal electrode layer 5 and the external electrode 3, a minimum thickness of the connecting end 21 of the internal electrode layer 5 with the external electrode 3 is required to be 0.3 μm or more, preferably 0.5 μm or more, more preferably 0.7 μm or more.

However, it is desirable that a maximum thickness of the internal electrode layer 5 be 2 μm or less, especially 1.5 μm or less, for the purpose of enabling miniaturization and high-lamination of a multilayer electronic component and also reducing the influence of unevenness due to the internal electrode layer 5.

Additionally, the internal electrode layer 5 of the present invention is desirably formed by an electroplating film, for the reason that the effective area can further be increased and the difference in thickness can be controlled at higher accuracy even if the internal electrode layer 5 is thinned. Even if the internal electrode layer 5 formed by the electroplating film is thinned, the effective area can further be increased thereby to increase electrostatic capacity.

The above-mentioned electroplating film composing the internal electrode layer 5 is desirably at least one base metal selected from the group consisting of Ni, Cu, Co, Fe, etc. It is more desirable to use Ni or Cu, in the point of enabling simultaneous firing with the dielectric layer 7. Thus, by using a base metal as a metal film that becomes an internal electrode pattern, it is easy to form the internal electrode pattern of high purity and low cost.

On the other hand, the dielectric layer 7 composing a multilayer electronic component of the present invention desirably has a thickness of 5 μm or less, especially 3 μm or less, more preferably 2 μm or less, in order that miniaturization and high-lamination are achieved for higher capacity. That is, since at least the non-connecting end of the internal electrode layer 5 is thinned, even if the thickness of the dielectric layer 7 is as small as 5 μm or less, unevenness due to the internal electrode layer 5 can be reduced thereby to suppress defects such as delamination.

As a dielectric material that becomes the dielectric layer 7 of the present invention, $BaTiO_3$ is suitably used as a main component, when Ni is used for the internal electrode layer 5. It is desirable to contain an assistant for improving sinterability and dielectric property of $BaTiO_3$. When Cu is used for the internal electrode layer 5, the dielectric material containing the above-mentioned assistant preferably further contains an assistant for low-temperature sintering of glass component and the like.

A method of manufacturing a multilayer electronic component of this preferred embodiment will next be described concretely based on FIGS. 2(a) to 2(e).

Figure 2:
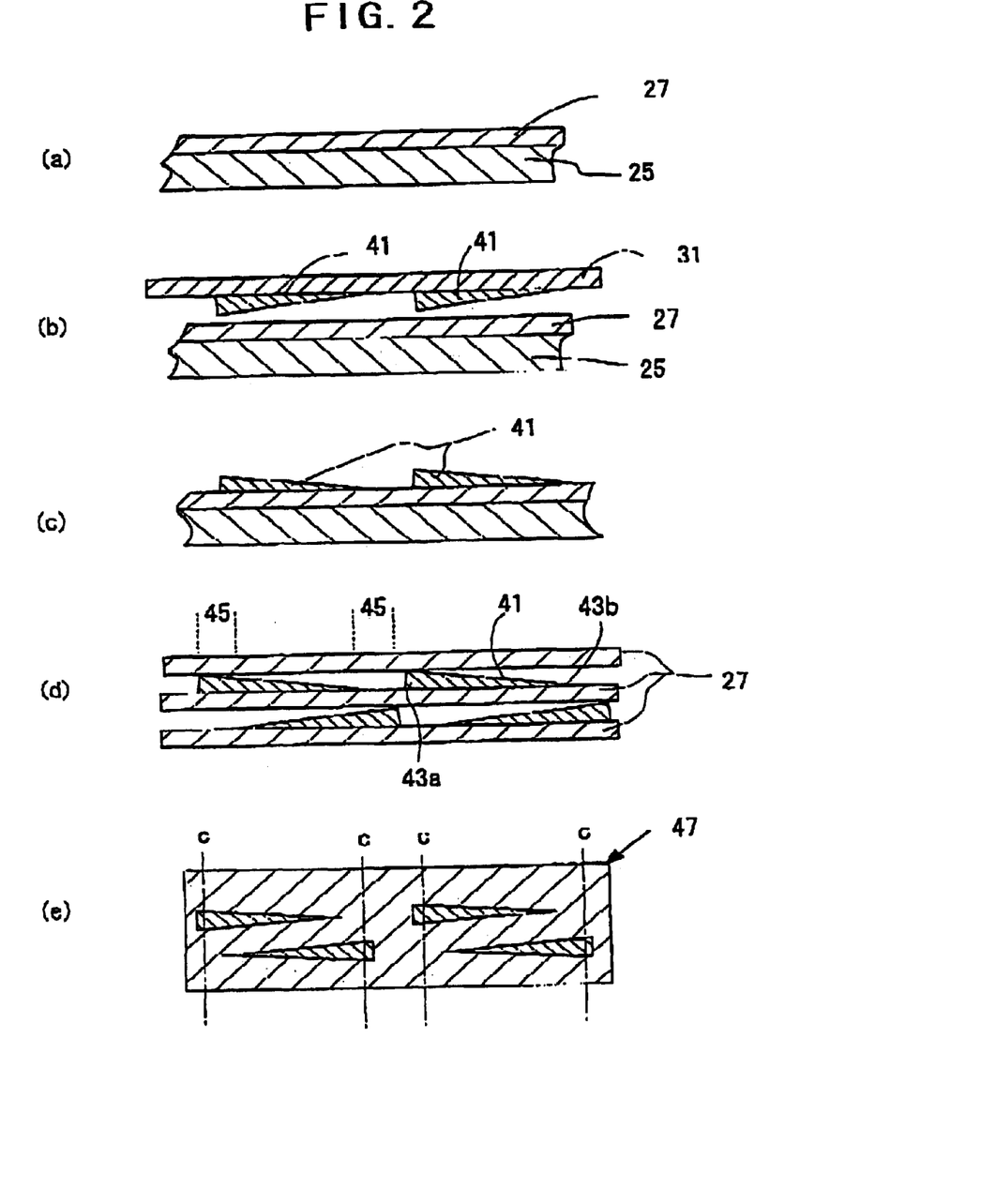

(A) First, a dielectric green sheet 27 that becomes a dielectric layer 7 and has a thickness of 1.5 to 5 μm is formed on a carrier film 25. The dielectric green sheet 27 is suitably formed with a slurry, which is for example prepared using a material powder of $BaTiO_3$ having a great specific surface area, by one forming method selected from doctor blade method, pull method, reverse roll coater method and gravure coater method.

The dielectric green sheet 27 so formed by the above method has a thickness of 12 μm or less, and it is desirably formed in the range of 1.5 to 5 μm, especially for the purpose of miniaturization and high capacity of a multilayer electronic component.

Figure 3:
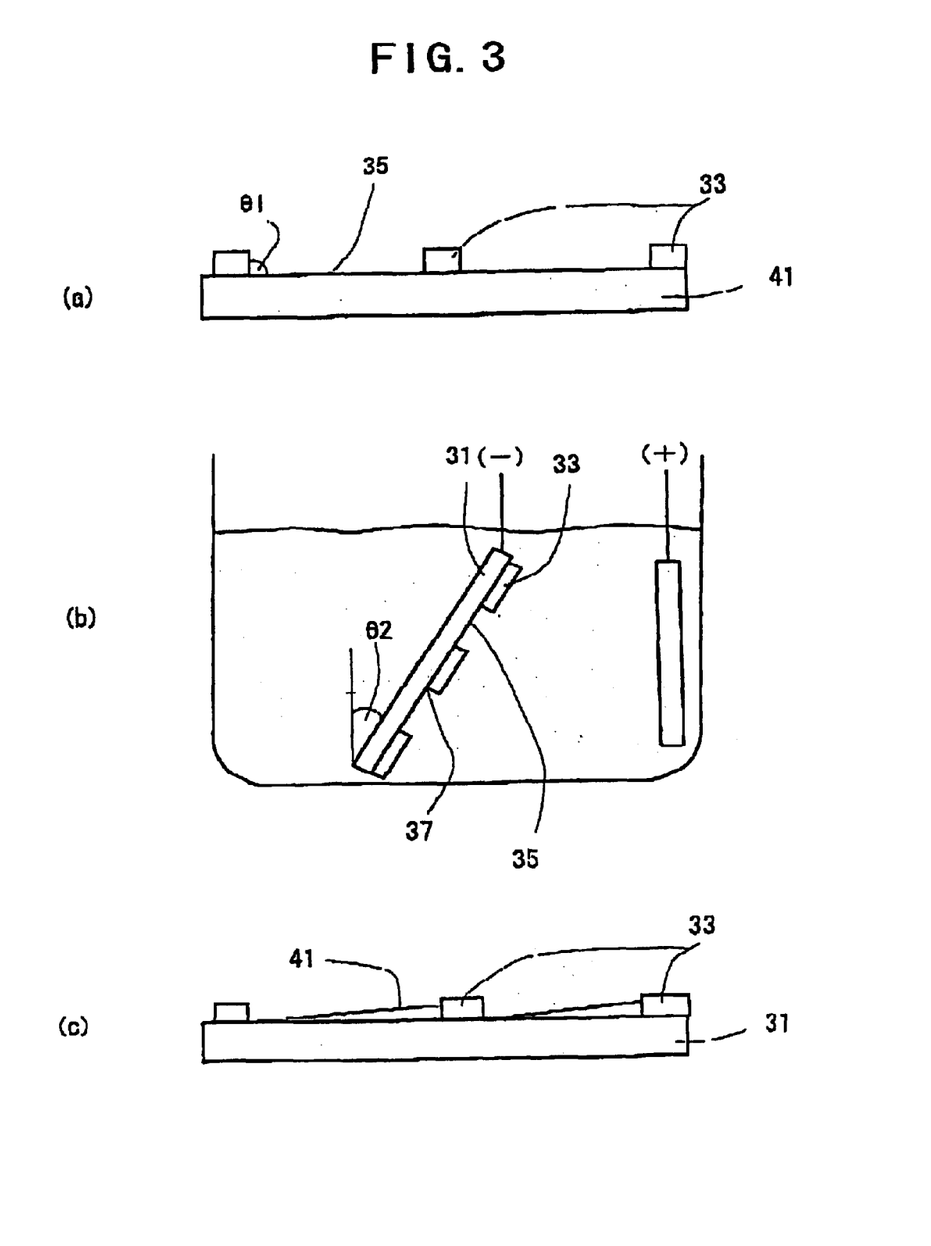

Next, an internal electrode layer 5 is formed by electroplating method. FIGS. 3(a) to 3(c) show the steps of forming an internal electrode pattern of the present invention. Referring to FIG. 3(a), a stainless steel plate, a titanium plate or the like, the surface of which is subjected to mirror finish, is used as a substrate plate 31 for film formation. A photosensitive resist resin is applied to the entire surface of the top surface of the substrate plate 31, followed by exposure and development in a state in which a region for forming an internal electrode pattern serving as the internal electrode layer 5 is masked so as not to be sensitized.

Then, an uncured resist is removed by cleaning, thereby forming a mask pattern 33 for electroplating, from which the resist corresponding to a region for forming the internal electrode layer 5 is removed. Hereat, the mask pattern 33 is preferably formed on the substrate plate 31 such that a region for forming a metal film serving as an internal electrode pattern becomes a steep recess part 35. A tilt angle θ1 of the recess part 35 is preferably 60 to 100°, especially 70 to 90°.

Referring to FIG. 3(b), electroplating using a Ni plating solution is performed to the substrate plate 31 on which the mask pattern 33 is formed. Hereat, in order to cause changes in the thickness of an internal electrode pattern to be formed, there is employed a method of immersing the substrate plate 31 in its tilted position into the plating solution such that the mask pattern 33 faces downwardly. Specifically in the present invention, electroplating is performed in a state in which the substrate plate 31 is tilted such that the mask pattern 33 makes an angle of θ2 to a vertical line.

By doing so, gas (hydrogen) generated during electroplating accumulates in a bottom corner part 37 of the recess part 35 of the mask pattern 33, and the base corner part 37 has poor plating by the presence of the gas so accumulated. This leads to an internal electrode pattern 41 of the present invention, characterized by a plating film having different thicknesses within the recess part 35, in other words, characterized in that a pair of edges opposed to each other in a rectangular plating film have different thicknesses (FIG. 3(c)).

That is, the internal electrode pattern 41, the thickness of which is gradually changed, is obtainable by tilting the substrate plate 31 as described above. The angle of θ2 is preferably 1° to 45°.

Whereas in obtaining an internal electrode pattern 41 that is uniform in thickness, it is required to incline the mask pattern 33 in an angle of 0° to −15°, and immerse it in the plating solution followed by stirring sufficiently, in order to prevent gas from accumulating in the base corner part 37 of the recess part 35 of the mask pattern 33.

Subsequently, the mask pattern is removed by cleaning, so that an Ni metal film serving as an internal electrode pattern 41 is formed on the substrate plate 31. Hereat, an average thickness of the metal film that becomes the internal electrode pattern is preferably 1 μm or less, more preferably 0.8 μm or less.

Thus, the formation of the internal electrode pattern 41 by electroplating enables to control a difference in thickness and manufacture a metal film having little or no defect such as holes, even if the metal film is extremely thinned to an average thickness of 1 μm or less, for example.

(B) Next, the substrate plate 31, on which the internal electrode pattern 41 is formed, is transferred to the dielectric green sheet 27 by thermo-pressure connection.

(C) Through this transfer step, the internal electrode pattern 41 can be formed on one main surface of the dielectric green sheet 27. In order to compensate for unevenness due to the internal electrode pattern 41 formed on the dielectric green sheet 27, an organic resin or the like may be applied to around the periphery of the internal electrode pattern 41. It is desirable to form such that the thickness of application of the organic resin corresponds to the thickness of the internal electrode pattern 41.

(D) Subsequently, a plurality of the dielectric green sheets 27, on which the internal electrode pattern 41 is formed, are laminated one upon another. In this laminating step, it is essential to laminate such that a difference in thickness of edges 43a and 43b of the internal electrode pattern 41 is compensated for in the laminating direction. That is, in the present invention there are laminated such that the edge 43b on a thin side of the internal electrode pattern 41 is disposed in a vertical direction of the edge 43a on a thick side, namely, the edge 43a is opposed to the edge 43b.

The internal electrode pattern 41 is also laminated so as to leave non-overlapping portions 45 where the edge 43a having the maximum thickness of the internal electrode pattern 41 does not overlap with the edge 43b having the minimum thickness of the internal electrode patterns 41, 41 disposed above and below the edge 43a.

Then, a plurality of dielectric green sheets 27, on which the internal electrode pattern 41 is not formed, are laminated on upper and lower surfaces of a laminated body of the green sheets 27 having the internal electrode patterns 41, and a lamination forming body 47 is prepared by press and heating.

(E) Next, electronic component base forming bodies are obtained by cutting the lamination forming body 47 in predetermined dimensions. Hereat, the lamination forming body 47 is cut, as indicated by cutting lines C in FIG. 2(e), so as to remove part of a thick side in the above-mentioned non-overlapping portions 45 of the internal electrode patterns 41 that are disposed regularly in the inside of the lamination forming body 47.

Thereafter, this electronic component base forming bodies are subjected to debinder treatment in an atmosphere at 250 to 300° C., or in a hypoxia atmosphere having an oxygen partial pressure of 0.1 to 1 Pa and at 500 to 800° C., and then fired in a nonoxidative atmosphere at 1250 to 1350° C. for two to three hours, thereby obtaining an electronic component body 1.

In order to obtain the desired dielectric property, there is further performed heat treatment under a hypoxia partial pressure having an oxygen partial pressure of about 0.1 to $10^{-4}$ Pa and at 900 to 1100° C. for 5 to 15 hours.

Finally, to an end face 11 of the obtained electronic component body 1, an external electrode paste is applied and then baked, thereby forming external electrodes 3. In an alternative, the external electrodes 3 may be formed by applying an external electrode paste to end faces of an electronic component base forming body 67, followed by simultaneous firing.

Since the thickness of connecting ends 21 of the internal electrode layers 5 which are exposed to the end faces of the electronic component body 1 is greater than that in the inside of the electronic component body 1, the connection with the external electrodes 3 can be ensured even if the internal electrode layers 5 are further thinned.

The above external electrode paste is prepared by using a Cu powder, bond and solvent. In order to increase the connection property with further thinned internal electrode layers 5, this Cu powder preferably contains a Cu fine powder that has an average particle diameter smaller than the thickness of the internal electrode layers 5, in an amount of not less than 10% by weight of the total amount of the Cu powder.

Additionally, it is desirable for the above-mentioned external electrodes 3 that the paste contains glass as a sintering assistant, besides a metal powder and an organic resin, for the purpose of increasing bonding property between the electronic component body 1 and the external electrodes 3.

Then, a Ni plating film and an Sn plating film are formed on the external electrodes 3, thereby manufacturing a multilayer ceramic capacitor.

The connecting end 21 of the internal electrode layers 5 in the first preferred embodiment may further have an extending part continuous from the connecting end 21, as described in the following.

<Second Preferred Embodiment>

Figure 4:
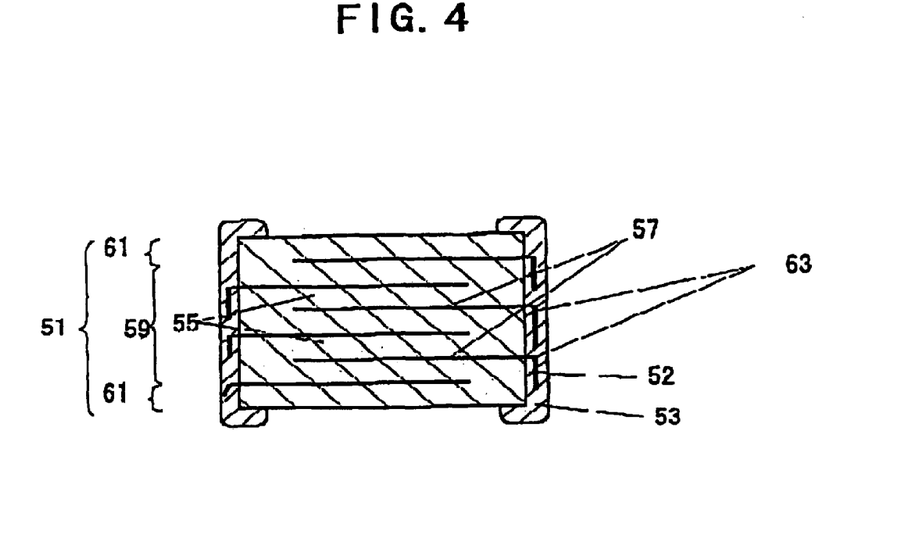
FIG. 4 is a schematic sectional view showing other example of a multilayer electronic component according to the present invention.

Other preferred embodiment of a multilayer ceramic capacitor that is a multilayer electronic component of the present invention is now described in detail. FIG. 4 is a schematic sectional view of a multilayer ceramic capacitor according to a second preferred embodiment. In this multilayer electronic component, external electrodes 53, 53 are formed on both end faces 52, 52 of an electronic component body 51.

The electronic component body 51 includes a capacity part 59 for developing electrostatic capacity which is formed by alternately laminating dielectric layers 55 and internal electrode layers 57, and a non-capacity part 61 not developing electrostatic capacity which is formed around the periphery of the capacity part 59 by using the same material as the dielectric layers 55.

The internal electrode layers 57 are alternately connected to the external electrodes 53 in the same end face 52. The internal electrode layer 57 has on the end face 52 an extending part 63 that is continuous from the inside. The extending part 63 in this case corresponds to a portion projecting at least 1 $\mu$m or more from the end face 52 of the electronic component body 51.

Figure 5:
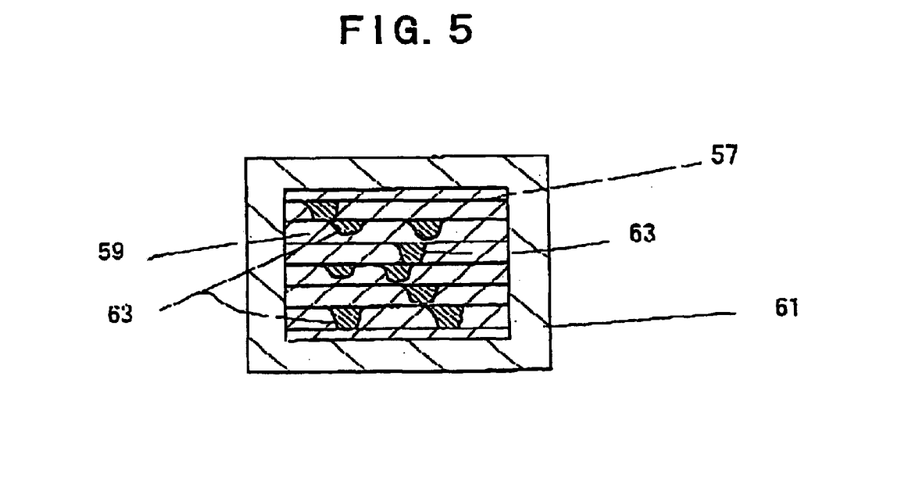
FIG. 5 is a schematic sectional view showing a capacity part in an end face of an electronic component body.

Referring to FIG. 5, it is also desirable that at least adjacent extending parts 63, 63 are connected to each other in the end face 52 of the electronic component body 51.

The maximum thickness of the internal electrode layer 57 is preferably 2 $\mu$m or less, and especially in the range of 0.4 to 1.8 $\mu$m, in order that the effective area is ensured by suppressing fracture of the internal electrode layer 57 and formation of holes.

It is desirable to satisfy the relationship: $(A1/A0) \geq 0.01\%$, where A0 is the area of the capacity part 59 in the end face 52 of the electronic component body 51, and A1 is the area of the extending parts 63. More preferably, A1/A0 is in the range of 0.05 to 60%, especially 0.1 to 10%, from the viewpoint of connection between the external electrode 53 and the extending part 63 extending from the internal electrode layer 57, as well as a strong connection between the external electrode 53 and a non-capacity part 61 of the end face 52. The area of the extending parts 63 is the sum of the areas of one side of all of the extending parts 63 projecting from one end face 52.

The area A0 of the capacity part 59 and the area A1 of the extending parts 63 can be found from picture analysis of the metal microphotograph of the end face.

It is desirable that the internal electrode layer 57 be formed by an electroplating film. This plating film contains a base metal material as a main component, which is preferably one of Ni and Cu, or alloy thereof.

Although the internal electrode layer 57 may have substantially a uniform thickness throughout its entire length, the thickness of the connecting end may be greater than that of the non-connecting end, as described above (the first preferred embodiment).

Preferably, the dielectric layer 55 has a thickness of 4 $\mu$m or less. Especially when the dielectric layer 55 has a thickness of 3 $\mu$m or less, preferably 2 $\mu$m or less, the connection between the extending parts 63 formed at the end part of the internal electrode layers 57 can be ensured.

In manufacturing a multilayer electronic component of the second preferred embodiment, an internal electrode pattern is prepared by electroplating method in the same manner as shown in FIGS. 3(a) to 3(c).

The multilayer electronic component of the second preferred embodiment can be manufactured according to the steps in FIGS. 6(a) to 6(d). Note that the method shown in FIGS. 2(a) to 2(e) is also applicable to the manufacturing steps of this embodiment, and therefore overlapping description is omitted herein.

Figure 6:
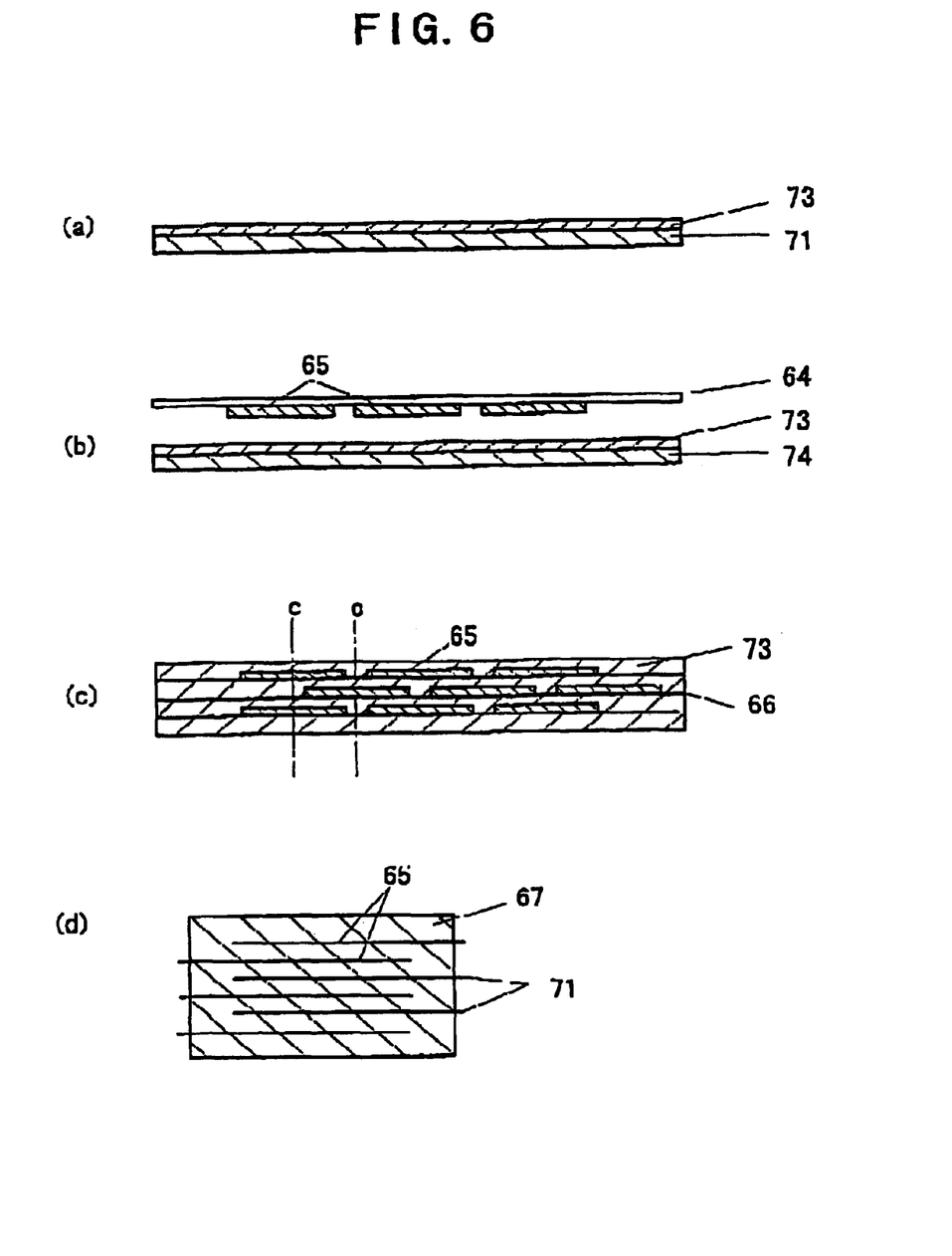

(A) First, a predetermined ceramic slurry is applied to a carrier film 71 thereby to form a dielectric green sheet 73.

(B) Then, the above-mentioned internal electrode pattern 65 is transferred onto the dielectric green sheet 73 by thermo-pressure connection. In this case, a metal film serving as the internal electrode pattern 65 has an average thickness of 2 $\mu$m or less, preferably 1.8 $\mu$m or less.

(C) A plurality of the dielectric green sheets 73, on which the internal electrode pattern 65 is formed, are laminated one on another, followed by heat press, thereby preparing a lamination forming body 66. At this time, the internal electrode patterns 65 are laminated such that the internal electrode patterns 65 in their respective layers are displaced at spaced intervals of half the longer-side direction of the internal electrode pattern 65.

Subsequently, the lamination forming body 66 is cut in a grid shape, thereby obtaining electronic component base forming body 67 (FIG. 6(d)). Hereat, the internal electrode patterns 65 laminated as described above are cut at positions corresponding to half the longer-side direction (the cutting lines C).

At that time, the cutting is performed such that the electronic component base forming body 67 has at its end face the extending part 71 continuous from the internal electrode pattern 65. Concretely, the extending part 71 is made large by increasing the number of rotation of a rotary knife when cutting the lamination forming body 66. In contrast, when the number of rotation of the rotary knife is low, the extending part 71 is made small. The extending part 71 can be formed also by adjusting the sending speed of the rotary knife.

(D) In other words, cutting at high speed enables to utilize ductility to the shear stress of an electroplating film, thereby cutting in a state in which the end part of the internal electrode pattern 65 is longer than the end part of the electronic component base forming body 67. This facilitates to form the extending part 71 continuous from the inside of the electronic component base forming body 67.

Thereafter, the electronic component base forming body 67 is subjected to debinder treatment and then firing. Further, heat treatment under a hypoxia partial pressure may be performed to obtain the desired dielectric property. Finally, external electrodes 53 are formed in the end face 61. A Ni plating film and an Sn plating film are formed on the external electrodes 53, thereby manufacturing a multilayer ceramic capacitor.

In the second preferred embodiment, the extending part 63 is formed at the end part of the internal electrode layer 57, and the extending part 63 is formed so as to project from the end face 52. Therefore, even if the internal electrode layer 57 is further thinned, the connection with the external electrodes 53 can be ensured.

Otherwise, this manufacturing method is the same as the foregoing first preferred embodiment.

It is suitable that electroplating films composing the internal electrode layers 57, 57 contain at least one base metal selected from Ni, Cu, Co, Fe, etc, and at least one element selected from the group consisting of Groups 3b to 6b elements in the periodic table, preferably sulfur.

The amount of content of at least one element selected from the group consisting of Groups 3b to 6b elements in the periodic table is desirably in the range of 5 to 2000 $\mu$g/g to the internal electrode layer 5. Thereby, it is capable of controlling the melting point of a base metal material composing the internal electrode layer and also suppressing deformation and shrinkage during firing. This permits a further increase in the following-up property and adhesive property with respect to the dielectric layer, thereby suppressing delamination and crack. The above expression that the amount of content of an element in Groups 3b to 6b elements in the periodic table is 5 to 2000 $\mu$g/g to the internal electrode layer means the amount of content of Groups 3b to 6b elements to 1 g of a base metal, such as Ni, which is a main component of the internal electrode layer.

In manufacturing a multilayer electronic component, an internal electrode pattern containing a base metal material and at least one selected from the group consisting of Groups 3b to 6b elements in the periodic table may be formed on a substrate plate by electroplating method. Otherwise, this manufacturing method is identical to that described above.

In order that Groups 3b to 6b elements in a plating bath can easily be contained in a plating film, the current density of electroplating is preferably 0.6 A/dm$^2$ or less. Groups 3b to 6b elements can be contained in a plating bath in the form of salt such as NiSO4, Ni(NH2SO2)2 and the like. A nickel anode containing either of 3b to 6b elements may be used.

The above-mentioned Groups 3b to 6b elements can be contained uniformly because a variety of metal ions can be dissolved uniformly in the plating bath according to the solubility of the metal. When a metal film containing Groups 3b to 6b elements in the periodic table is used as an internal electrode pattern, the melting point of a base metal material composing the internal electrode pattern is lowered during firing. This facilitates to form a liquid phase thereby to decrease the rigidity of the internal electrode pattern. Hence, the shape follow-up property of the internal electrode layer to the surface of the dielectric layer during firing can be increased, so that adhesive property between the dielectric layer and the internal electrode layer is enhanced thereby to prevent delamination and crack of the multilayer electronic component.

The multilayer electronic component of the present invention is also applicable to a laminating type actuator, inductor other than multilayer ceramic capacitors.

The following examples illustrate the manner in which the present invention can be practiced. It is understood, however, that the examples are for the purpose of illustration and the invention is not to be regarded as limited to any of the specific materials or condition therein.

EXAMPLE I

A multilayer ceramic capacitor that is one of multilayer electronic components was manufactured in the following manner.

First, to a dielectric powder containing BaTiO$_3$ as a main component, an organic bond, a plasticizer, a dispersing agent and a solvent were mixed in their respective predetermined amounts. This mixture was then ground and kneaded by use of a vibrating mill, thereby preparing a slurry. With a die coater, a dielectric green sheet having a thickness of 2.4 μm was manufactured on a carrier film made of polyester.

Subsequently, a resist pattern was formed by applying a photosensitive resist resin to the surface of a substrate plate made of a mirror-finish stainless steel plate.

This substrate plate was then immersed in a plating bath such that a mask pattern faces downwardly, and electroplating was performed while variously adjusting current density and plating time, so that a Ni plating film having different thicknesses at both ends thereof was formed on the substrate plate made of the stainless steel plate. The average thickness was set to 0.7 μm.

Subsequently, an internal electrode pattern composed of the above Ni plating film was mounted on the dielectric green sheet, and transferred by thermo-pressure connection under the conditions of 80° C. and 80 kg/cm$^2$, thereby manufacturing a dielectric green sheet to which the internal electrode pattern was transferred.

As shown in FIG. 2(d), 400 pieces of the dielectric green sheets with the internal electrode pattern transferred were laminated one on another, followed by press and laminate under the conditions of a temperature of 100° C. and a pressure of 200 kgf/cm$^2$, thereby manufacturing a lamination forming body.

Thereafter, an electronic component base forming body was obtained by cutting this lamination forming body at predetermined positions, as shown in FIG. 2(e), with the rotary knife. In that case, as the extending part of an internal electrode layer might not be formed as much as possible, the number of rotations of the rotary knife was adjusted. The electronic component base forming body was then subjected to debinder treatment at 500° C. to 800° C. in a nonoxidative atmosphere, followed by firing at 1300° C. for two hours in the same atmosphere, thereby obtaining an electronic component body.

A connecting end having a greater thickness than that of other regions of the internal electrode layer was exposed on both end faces of the electronic component body, and the internal electrode layers overlapped and laminated in the thickness direction were formed without dislocation.

Finally, to the electronic component body so obtained, a Cu paste containing glass powder was applied to the respective end faces, to which the internal electrode layer was exposed, followed by baking in a nitrogen atmosphere. A Ni plating film and an Sn plating film were formed on the surface of external electrodes, thereby manufacturing a multilayer ceramic capacitor having the external electrodes electrically connected to the internal electrode layers.

The outside dimension of the obtained multilayer ceramic capacitor was 1.25 mm in width, 2.0 mm in length, and 1.25 mm in thickness. The thickness of the dielectric layer interposed between the internal electrode layers was 2 μm. The distance from the connecting end of the internal electrode layers with the external electrode to the non-connecting end was set to 1.7 mm. Plating conditions was adjusted such that L/t had the values indicated in Table 1. In case of making no gradual difference in thickness in the internal electrode pattern, a resist was partially disposed after plating in a small thickness one time, and electroplating was performed again to form a plating film having different thicknesses.

After firing, the measurement of initial electrostatic capacity (C) was made to 100 samples of the same multilayer ceramic capacitor so obtained, and their respective variations were evaluated. The measurement was made at a reference temperature of 25° C. under the conditions of 1.0 kHz in frequencies and 0.5 Vrms in input signal level. Further, as to the respective 100 samples, the number of delamination occurred after firing and that after thermal shock resistance test were evaluated. The covering percentage of the internal electrode layers in all of the samples was set to 95%. The thermal shock resistance test was conducted with a plating bath heated to 365° C.

As a comparative example, a multilayer ceramic capacitor whose difference in in-plane thickness was below 0.1 μm, which is substantially a uniform thickness in the present invention, was prepared by using an internal electrode pattern. The same evaluations were made as in the present invention. This internal electrode pattern having a uniform thickness was prepared by inclining a mask pattern in the angle θ2, which is shown in FIG. 3(b), of 0° to −15° and stirring sufficiently.

TABLE 1

| Sample No. | Internal Electrode Layers | | | Electrical Property | | Number of Delamination/100 | |
|---|---|---|---|---|---|---|---|
| | Difference in Thickness | Gradually Thinning | L/ (t1 − t2) | Electrostatic Capacity μF | Variations of Electrostatic Capacity % | After Firing | After Thermal Shock Resistance Test |
| * I-1 | None | None | 0 | 9.3 | 0.7 | 1/100 | 2/100 |
| I-2 | Present | None | 4000 | 9.7 | 0.55 | 0/100 | 0/100 |
| I-3 | Present | Present | 500 | 9.8 | 0.53 | 0/100 | 0/100 |
| I-4 | Present | Present | 4000 | 9.9 | 0.52 | 0/100 | 0/100 |
| I-5 | Present | Present | 20000 | 10 | 0.5 | 0/100 | 0/100 |

Sample numbers marked with * are not within the scope of the present invention.

As apparent from the results of Table 1, in Samples Nos. I-2 to I-5, each having internal electrode layers whose connecting end with external electrodes was thicker than other parts in a plane, even if the average thickness of the internal electrode layers was extremely reduced to as small as 0.7 μm, there were obtained electrostatic capacity not less than 9.7 μF, approaching a target value of 10 μF, and variations in electrostatic capacity was 0.55% or less. In addition, Samples Nos. I-2 to I-5 had no delamination after firing and after thermal shock resistance test.

Especially, in Samples Nos. I-3 to I-5, wherein the internal electrode layers were gradually thinned from the connecting end with the external electrodes to the non-connecting end, electrostatic capacity was 9.8 μF or more, and variations thereof was 0.53% or less.

Whereas in Sample No. I-1 having internal electrode layers of uniform thickness, electrostatic capacity was as low as 9.3 μF or less, and variations in electrostatic capacity was as large as 0.7%. In this sample, delamination occurred after firing and after thermal shock resistance test.

EXAMPLE II

A multilayer ceramic capacitor that is one of multilayer electronic components was prepared in the following manner.

First, a ceramic slurry composed of dielectric powder containing $BaTiO_3$ as a main component, an organic bond and a solvent was prepared. Using this ceramic slurry, a dielectric green sheet having a thickness of 3.5 μm was formed on a carrier film made of polyester by using die coater.

Subsequently, a photosensitive resist resin was applied to the surface of a substrate plate made of a mirror-finish stainless steel plate, followed by exposure and cleaning, thereby forming a mask pattern.

Then, in a state in which the substrate plate made of the stainless steel plate was immersed in a Ni plating bath, electroplating treatment was performed to form a metal film in a 4 mm×1 mm rectangle having an average thickness of 1.8 μm and containing Ni as a main component. In Sample No. II-8, the same Ni plating film was prepared by electroless plating method.

Thereafter, an internal electrode pattern composed of the Ni plating film prepared by the above-mentioned electroplating method and the electroless plating method was transferred by thermo-pressure connection under the conditions of 80° C. and 80 kg/cm², thereby obtaining a dielectric green sheet on which the internal electrode pattern was formed.

Then, 200 pieces of the dielectric green sheets, to which the internal electrode pattern was transferred, were laminated one on another, followed by press and laminate under the conditions of a temperature of 100° C. and a pressure of 80 kgf/cm², thereby obtaining a lamination forming body.

This lamination forming body was then cut in a grid shape by a rotary knife at the number of rotations shown in Table 1, thereby obtaining electronic component base forming body. One end of the internal electrode pattern was alternatively exposed to the end faces of this electronic component base forming body. Further, there were partially formed extending parts continuous from the internal electrode pattern, and the adjacent extending parts were connected to each other at the end face of a capacity part. The internal electrode patterns overlapped and laminated in the thickness direction were formed without dislocation.

The electronic component base forming body was then subjected to debinder treatment in an atmosphere at 300° C., or in a hypoxia atmosphere having an oxygen partial pressure of 0.1 to 1 Pa and at 500° C., and then fired in a nonoxidative atmosphere having an oxygen partial pressure of $10^{-7}$ Pa and at 1300° C. for two hours, and further subjected to oxidization treatment under a hypoxia partial pressure having an oxygen partial pressure of 0.01 Pa and at 1000° C. for 10 hours, thereby obtaining an electronic component body.

Finally, to the electronic component body so obtained, a Cu paste containing glass powder was applied to the respective end faces, to which internal electrode layer was exposed and in which the extending part was formed. Then, baking was performed in a nitrogen atmosphere at 900° C. Thereafter, a Ni plating film and an Sn plating film were formed, and external electrodes electrically connected to the internal electrode layers were formed, thereby manufacturing a multilayer ceramic capacitor.

The outside dimension of the obtained multilayer ceramic capacitor was 1.25 mm in width, 2.0 mm in length, and 1.25 mm in thickness. The thickness of the dielectric layer interposed between the internal electrode layers 9 was 2.5 μm.

Measurements were made of the electrostatic capacity of 100 samples of the same multilayer ceramic capacitor so obtained. The measurement conditions were 1V and 1 kHz.

The manufactured multilayer ceramic capacitor was mounted on a print substrate for evaluation, and the presence and absence of peeling of the external electrode was evaluated by placing a load of 500 g from the side surface (bonding strength measurement of the external electrodes). The evaluation results were expressed by the number of peeled samples in 20 samples. Table 2 shows the respective measurement results.

On the other hand, as a comparative example, a sample whose internal electrode layers were formed by a conventional conductor paste was prepared, and its evaluation was made in the same manner.

TABLE 2

| Sample No. | Internal Electrode Layers | Number of Rotations of Rotary Knife r.p.m | Extending Parts | Area Ratio of Extending Parts *2 % | Electro-static Capacity $\mu$F | Variations in Electro-static Capacity $\mu$F | Bonding Strength of External Electrodes (Number) |
|---|---|---|---|---|---|---|---|
| II-1 | Electroplating Film | 500 | Present | 0.005 | 9.2 | 0.09 | 2/20 |
| II-2 | Electroplating Film | 1000 | Present | 0.01 | 9.5 | 0.06 | 0/20 |
| II-3 | Electroplating Film | 2000 | Present | 0.1 | 9.7 | 0.05 | 0/20 |
| II-4 | Electroplating Film | 2500 | Present | 1 | 10 | 0.03 | 0/20 |
| II-5 | Electroplating Film | 3000 | Present | 10 | 10.2 | 0.03 | 0/20 |
| II-6 | Electroplating Film | 3500 | Present | 60 | 10.5 | 0.02 | 1/20 |
| II-7 | Electroplating Film | 4000 | Present | 80 | 10.7 | 0.02 | 1/20 |
| II-8 | Electroless Plating Film | 1000 | Present | 0.004 | 9.1 | 0.1 | 2/20 |
| * II-9 | Conductor Paste | 3000 | None | 0 | 9 | 0.17 | 5/20 |

Sample numbers marked with * are not within the scope of the present invention.
*2: Ratio of A1/A0, where A0 is the area of the capacity part, and A1 is the area of the extending parts.

As apparent from the results of Table 2, in Samples Nos. II-1 to II-8, each having the extending parts continuous from the internal electrode layers in the end faces of the electronic component body, electrostatic capacity was 9.1 $\mu$F or more, and variations in electrostatic capacity was 0.1 $\mu$F or less, and the occurrence of peeling in the evaluation of bonding strength with the external electrodes was low, that is, 3/20 pieces or less.

In Samples Nos. II-1 to II-7, each using an electroplating film as an internal electrode layer, electrostatic capacity was 9.2 $\mu$F or more, and variations in electrostatic capacity was 0.09 $\mu$F or less, and the occurrence of peeling in the evaluation of bonding strength with the external electrodes was lower, that is, 2/20 pieces or less.

In Samples Nos. II-2 to II-6, in which the area ratio of the extending parts was in the range of 0.01 to 60%, electrostatic capacity was 9.5 $\mu$F or more, and variations in electrostatic capacity was 0.06 $\mu$F or less, and the occurrence of peeling in the evaluation of bonding strength with the external electrodes was 1/20 pieces or less. Especially in Samples Nos. II-3 to II-5, in which the area ratio of the extending parts was in the range of 0.1 to 10%, electrostatic capacity was 9.7 $\mu$F or more, and variations in electrostatic capacity was 0.05 $\mu$F or less, and there was no peeling in the evaluation of bonding strength with the external electrodes.

Whereas in Sample No. II-9 that was beyond the scope of the invention, electrostatic capacity was low, variations was large, and the occurrence of peeling in the bonding strength evaluation was as many as 5/20 pieces.

REFERENCE EXAMPLE

In the same manner as in Example 1, a resist pattern was formed on the surface of a substrate plate. Subsequently, while variously adjusting current density and plating time, electroplating was performed to form, on the substrate plate made of a stainless steel plate, a Ni plating film having a uniform thickness (0.5 $\mu$m in thickness), which contains different amounts of Groups 3b to 6b elements. For example, as to sulfur component in Groups 3b to 6b elements, electroplating was performed using a nickel anode contain-ing sulfur in an amount of about 4×10$^4$ $\mu$g/g. Other elements of Groups 3b to 6b were similarly contained in a nickel anode, and electroplating was performed.

Subsequently, an internal electrode pattern composed of this Ni plating film was mounted on a dielectric green sheet, and transferred by thermo-pressure connection under the conditions of 80° C. and 80 kg/cm$^2$, thereby manufacturing a dielectric green sheet to which the internal electrode pattern was transferred.

Then, 200 pieces of the dielectric green sheets with the internal electrode pattern transferred were laminated one on another, followed by press and laminate under the conditions of a temperature of 100° C. and a pressure of 200 kgf/cm$^2$, thereby manufacturing a lamination forming body.

Thereafter, an electronic component base forming body was obtained by cutting this lamination forming body in a grid shape. The electronic component base forming body was then subjected to debinder treatment at 300° C. to 500° C. in a nonoxidative atmosphere, followed by firing at 1300° C. for two hours in the same atmosphere, thereby manufacturing an electronic component body.

Finally, to the electronic component body so obtained, a Cu paste containing glass powder was applied to the respective end faces to which the internal electrode layer was exposed, followed by baking in a nitrogen atmosphere. A Ni plating film and a Sn plating film were formed on the surface of external electrodes, thereby manufacturing a multilayer ceramic capacitor having the external electrodes electrically connected to the internal electrode layers.

The outside dimension of the obtained multilayer ceramic capacitor was 1.25 mm in width, 2.0 mm in length, and 1.25 mm in thickness. The thickness of the dielectric layer interposed between the internal electrode layers was 2 $\mu$m.

After firing, the measurement of initial electrostatic capacity (C) was made to 100 samples of the same multilayer ceramic capacitor so obtained. The measurement was made at a reference temperature of 25° C. under the conditions of 1.0 kHz in frequencies and 0.5 Vrms in input signal level. Further, as to the respective 100 samples, the number of delaminations occurred after firing and that after thermal shock resistance test were evaluated. The thermal shock resistance test was conducted by immersing the samples in a plating bath heated to 365° C. The amount of content of Groups 3b to 6b elements in the internal electrode layers was found by use of ICP emission spectral analysis method.

TABLE 3

| Sample No. | Groups 3b to 6b Elements | | Electro-plating Current Density A/dm² | Electro-static Capacity μF | Number of Delamination & Cracks | |
|---|---|---|---|---|---|---|
| | Elements | Content μg/g | | | After Firing | After Thermal Shock Resistance Test |
| III-1 | Sulfur | 5 | 0.2 | 9.8 | 6/100 | 9/100 |
| III-2 | Sulfur | 150 | 0.2 | 9.8 | 1/100 | 3/100 |
| III-3 | Sulfur | 200 | 0.4 | 9.8 | 0/100 | 1/100 |
| III-4 | Sulfur | 1500 | 0.5 | 9.7 | 1/100 | 2/100 |
| III-5 | Sulfur | 2000 | 0.6 | 9.6 | 3/100 | 4/100 |
| III-6 | Sulfur | 3000 | 0.7 | 9.8 | 7/100 | 9/100 |
| III-7 | Boron | 150 | 0.5 | 9.8 | 5/100 | 12/100 |
| III-8 | Carbon | 150 | 0.5 | 9.8 | 4/100 | 11/100 |
| III-9 | Phosphorus | 150 | 0.5 | 9.8 | 3/100 | 12/100 |
| III-10 | Tin | 150 | 0.5 | 9.8 | 4/100 | 13/100 |
| III-11 | Lead | 150 | 0.5 | 9.8 | 5/100 | 14/100 |

As apparent from the results of Table 3, in Samples Nos. III-1 to III-11, which were prepared by using the internal electrode pattern containing one of Groups 3b to 6b elements in the plating film, the rate of occurrence of delamination after firing was improved to 7/100 pieces or less, and that after thermal shock resistance test was improved to 14/100 pieces or less.

In Samples Nos. III-1 to III-6, which were formed by using the internal electrode pattern containing sulfur, especially Sample No. III-6 in which the content of sulfur was increased to 3000 μg/g, breakage of the internal electrodes layers occurred and electrostatic capacity was lowered, whereas the rate of occurrence of delamination and cracks after thermal shock resistance test were 9/100 pieces or less. Samples Nos. III-2 to III-4, each using the internal electrode pattern in which the content of sulfur was 150 to 1500 μg/g, the rate of occurrence of delamination and cracks after thermal shock resistance test was further reduced, and fraction defective was 3/100 pieces or less.

What is claimed is:

1. A multilayer electronic component comprising:
   an electronic component body containing dielectric layers and internal electrode layers that are alternatively laminated, said internal electrode layers being exposed alternatively to end faces on opposite sides along a laminating direction; and
   external electrodes disposed on both end faces of said electronic component body and connected to said internal electrode layers,
   wherein a thickness of a connecting end of said internal electrode layers with said external electrodes is greater than a thickness of a non-connecting end.

2. The multilayer electronic component according to claim 1 wherein internal electrode layers are gradually thinned from a connecting end with external electrodes to a non-connecting end.

3. The multilayer electronic component according to claim 1 wherein an average thickness of internal electrode layers is 1 μm or less.

4. The multilayer electronic component according to claim 1 wherein a thickness of dielectric layers is 5 μm or less.

5. The multilayer electronic component according to claim 1, satisfying the relationship of (L/t)≧500, where L is a distance from a connecting end of internal electrode layers to a non-connecting end, and t is a maximum thickness of said internal electrode layers.

6. The multilayer electronic component according to one of claims 1, wherein internal electrode layers are formed by an electroplating film.

7. The multilayer electronic component according to claim 1 wherein internal electrode layers are composed of a base metal.

8. The multilayer electronic component according to claim 1 wherein said internal electrode layers contain a base metal material and at least one element selected from Groups 3b to 6b elements in the periodic table.

9. The multilayer electronic component according to claim 8 wherein at least one element selected from Groups 3b to 6b elements in the periodic table is sulfur.

10. The multilayer electronic component according to claim 8 wherein the amount of content of Groups 3b to 6b elements in the periodic table is in a range of 5 to 2000 μg/g to internal electrode layers.

11. The multilayer electronic component according to claim 1 wherein internal electrode layers have extending parts on a connecting end with said external electrodes.

12. The multilayer electronic component according to claim 11 wherein extending parts are connected to each other.

13. A method of manufacturing a multilayer electronic component comprising the steps of:
    preparing a substrate plate having a mask pattern;
    performing electroplating in a state in which said substrate plate is tilted such that said mask pattern faces downwardly, so that an internal electrode pattern whose edges have different thicknesses is formed in a recess part partitioned by said mask pattern on the surface of said substrate plate;
    transferring said internal electrode pattern on the surface of said substrate plate, to a dielectric green sheet;
    forming a lamination forming body by laminating such that a total thickness of edges of said internal electrode pattern is compensated for in a laminating direction; and
    forming an electronic component base forming body in which one edge of said internal electrode pattern is exposed by cutting said lamination forming body in a laminating direction.

14. The method according to claim 13 wherein an internal electrode pattern is gradually thinned from an exposed edge to an unexposed edge.

15. The method according to claim 13 wherein an average thickness of an internal electrode pattern is 1 μm or less.

16. The method according to claim 13 wherein a main component of an internal electrode pattern in a base metal.

17. The method according to claim 13 wherein an internal electrode pattern contains a base metal material and at least one element selected from Groups 3b to 6b elements in the periodic table.

18. A multilayer electronic component comprising:
    an electronic component body having a capacity part developing electrostatic capacity which is formed by alternatively laminating dielectric layers and internal electrode layers, and a non-capacity part not developing electrostatic capacity which is disposed around the periphery of said capacity part and formed by said dielectric layers; and a pair of external electrodes disposed on both end faces of said electronic component body, respectively, and connected to said internal electrode layers, wherein said electronic component body has on both end faces thereof an extending part continuous from said internal electrode layers.

19. The multilayer electronic component according to claim 18 wherein extending parts are connected to each other at end faces of said electronic component body.

* * * * *